Figure 1:
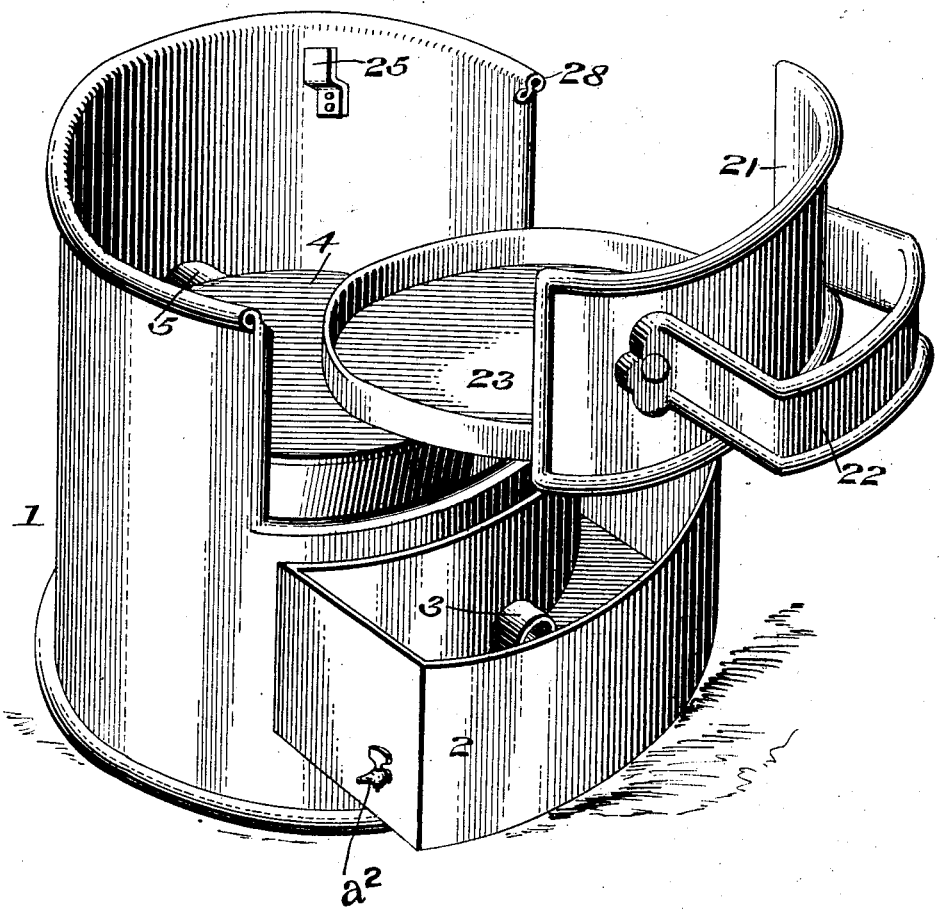

H. A. WINTERKNIGHT.
COOKING APPARATUS.
APPLICATION FILED MAY 26, 1908.

925,672.

Patented June 22, 1909.
2 SHEETS—SHEET 1.

Witnesses
P. F. Nagle
L. Rouville

Inventor
Henry A. Winterknight
By H. J. Heaton
Attorney

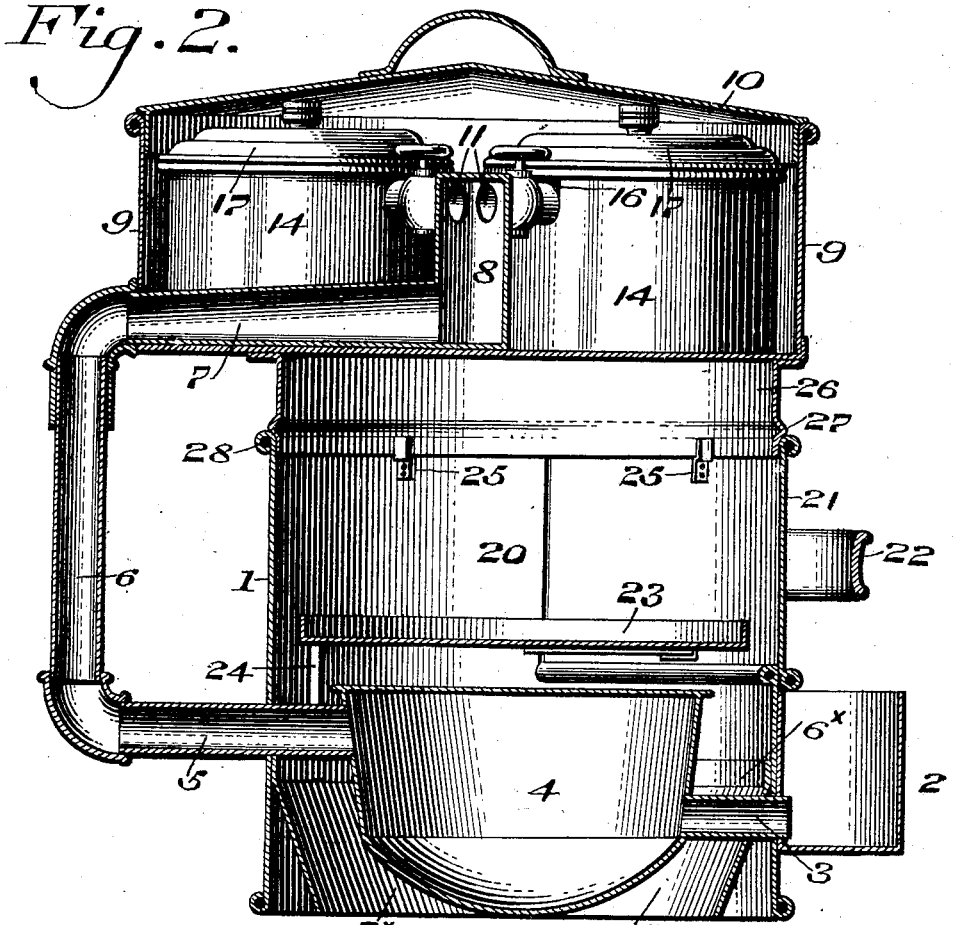

UNITED STATES PATENT OFFICE.

HENRY A. WINTERKNIGHT, OF PHILADELPHIA, PENNSYLVANIA.

COOKING APPARATUS.

No. 925,672.  Specification of Letters Patent.  Patented June 22, 1909.

Application filed May 26, 1908. Serial No. 435,168.

*To all whom it may concern:*

Be it known that I, HENRY A. WINTERKNIGHT, a citizen of the United States, residing in the city of Philadelphia, State of Pennsylvania, have invented certain new and useful Improvements in Cooking Apparatus, of which the following is a full, clear, and exact description, reference being had to the accompanying drawings, forming a part of this specification.

My invention relates to portable cooking apparatus designed for use on a coal, gas or oil stove, and has for its object to provide a combined roasting or baking and boiling or steaming apparatus, in which the elements are so constructed and combined that the heat applied through the single basal opening in the casing will act simultaneously on the several elements in the concrete structure to effect the results stated; and whereby articles of food required to be baked or roasted and articles required to be boiled or steamed, or otherwise subjected to known cooking processes, or even kept hot after cooking, may be so acted upon simultaneously.

To these ends my invention consists of an apparatus adapted to perform the functions and accomplish the objects stated, comprising the novel features of construction, as hereinafter set forth.

The novel and identifying features of the complete device, in its best form, and of sub-combinations of some of the elements thereof, also embodying novel features of my invention, I will now describe at length and finally point out in the claims to be appended to such description.

In the accompanying drawings illustrating the invention in its complete and best form known to me, Figure 1 is an elevation in perspective, of the apparatus, with the steaming pan removed. Fig. 2 is a vertical sectional view of the complete structure, illustrating the relation to the elements shown in Fig. 1, of the steaming pan operatively supported above the casing, and the adjunctive elements of the steaming pan. Fig. 3 is a plan view, partly in section, of the central distributing-receiver within the steaming pan, and Fig. 4 is a detail view of a portion of such a cooking utensil having a suitable opening in its cover or lid.

Similar numerals of reference indicate corresponding parts in the figures.

Referring to the drawings:—The inclosing casing forming the oven of my novel cooking apparatus is indicated at 1, and has mounted on its exterior wall, a segmental water trough or reservoir 2 open at the top and governed by a spigot $2^a$. This water reservoir communicates by a pipe 3, passing through the casing 1, with a vessel 4 adapted to operate as a boiler and which is therefore closed except for the inlet pipe 3 just mentioned, and an outlet pipe 5 passing through the casing 1 at a suitable point. This vessel 4 is preferably provided with a surrounding annular baffle member $6^x$ which should be provided with sides $7^x$ converging toward the bottom of the casing 1, which, of course, is open for the purpose of providing a supporting base over a stove hole, gas burner or the like, in such manner that the heat therefrom will first heat the boiler and pass upward to the base of the roasting pan, and it is clear that when the casing is positioned over the said burner, the flame will be better directed by the sides $7^x$ upwardly and against the sides of the boiling vessel 4 which latter it will be noted, is preferably provided with a downwardly projecting bottom so that all parts of the interior thereof may be subjected to as even a heat as possible. This boiler 4 is adapted to contain water which is fed by gravity from the reservoir 2 in which a supply sufficient to meet the demands of the boiler 4 is constantly kept.

It will, of course, be understood that owing to the location of the boiler 4 directly over the burner or burners that the contents thereof is constantly being evaporated, the most of which passes away in the form of steam through the tubular outlet 5 leading therefrom. Secured to the tubular outlet 5 is a tubular conduit 6 preferably outside of the casing 1 and leading upwardly and communicating by an inlet pipe 7 with a steam-distributing receiver 8 located centrally in a steaming pan 9 preferably supplied with the cover 10, whereby the contents thereof are protected from the cooling effect of the outside air. The centrally-disposed steam-distributing receiver 8 is provided with a plurality of tubular outlets 11 whereby the steam may be led through several radial pipes 12 to outlets 13 each adapted to communicate with the interior of a cooking utensil 14, through an opening 19 in the flange of its lid. Each of the pipes 12 has a valve 15 therein whereby the steam may be cut off or admitted as desired, to the respective utensils 14. These utensils 14 may however be provided near the top with a cut-away portion 16 to receive the end of the pipe 12 in order that the outlet 13 thereon may be positioned well within the same instead of through the lid, or both may be employed, whereby the projecting flange 18 adapted to fit within the utensil 14 has its opening 19 adapted to coincide with the cut-away portion 16 of the utensil 14 so that the top may be accurately closed over the top of the can and all escape of steam prevented. This flange 18 also serves another purpose, that of a closure for the cut-away portion 16, for when the steam has been shut off from the contents of the can 14 it is only necessary to give the top 17 a slight turn, in order to completely cut off any communication from the outside of the can. In this way it will be clear that after the contents of a can have been completely cooked they may be maintained at an even temperature by a slight turn of the top to close the opening in the side. Again, this steaming pan 9 may be partially filled with water so that the outside of the utensils 14 are kept in a heated condition.

It will be noted that the steaming pan 9 is supported on the open top of the casing 1 and therefore located at some distance above the boiler 4 in order to provide a space 20 between them which serves the purpose of an oven, access to the interior of which is provided for by cutting away a segmental portion of the casing 1 to receive a removable closure 21 having an operating handle 22 secured thereto and on the interior has fixed thereto in transversely-disposed position, a plate 23 which serves as a pan or the like for articles to be roasted or baked. A supporting leg 24 is preferably supplied, and it is attached to the plate in position to engage the outlet pipe 5 or other suitable portion of the interior of the casing in order to prevent any sagging of the plate at a point which is unsupported from the closure 21. Clips 25 are positioned at suitable intervals around the interior wall of the casing 1 and form a supporting means for a downwardly projecting annular ring 26 secured to the bottom of the steaming pan 9. This ring 26 is provided with a circumferential flange 27 which is adapted to rest on the top of the casing 1 which latter is provided with a bead 28 in order to form a close joint. It will, however, be understood that this form of joining is of minor importance as any suitable joint may be employed which will prevent the loss of heat between the several parts.

The operation of the device is as follows:— The oven having been placed over a suitable burner so that the baffle $7^\times$ is suitably positioned thereover, to direct the heat against the boiler 4, and upward into the oven portion. Water is poured into the reservoir 2 until a sufficient height has been reached in the vessel 4. As soon as the boiling point is reached within the vessel 4 the apparatus is fully operative for all purposes. Whatever it is desired to bake or roast is placed upon the pan 23 and passed into the oven 20, the closure 21 completely sealing the cut-away portion of the casing 1. In the meantime, other articles which are to be steamed, boiled or otherwise cooked in a different manner are placed in the various utensils 14 within the steaming pan 9, and the covers 17, turned so that the aperture 19 coincides with the cut-away portion 16 whereupon the pipe 12 may be inserted well within its respective can. Steam now passes upward through the pipe 6 into the steam-distributing receiver 8 and through its several valved outlets to the utensils 14 containing the articles, the valves being first opened so as to admit the steam. The water in the utensils 14 which contain the articles, is soon brought to the boiling point and the cooking takes place and continues until the articles are "done", when each utensil in turn has the supply of steam cut off by closing its valve.

It is well known that different articles of food take longer to prepare than others and therefore, as the contents of each utensil 14 reaches the completed stage, the valve-controlling admission of steam thereto is shut off, the utensil moved away slightly so as to remove the end of the pipe 12 and the top or cover 17 is then rotated so as to completely close the opening 16. In this way, a complete meal may be cooked on my very novel oven, the upper portion being devoted to the boiling of the article while the lower oven portion is used for roasting, baking and the like.

It will be clear that I have devised a very simple and complete, unitary structure which may be easily taken apart and transported from one place to another with the smallest amount of trouble and in an exceedingly compact manner.

Having thus described my invention, I claim as new and desire to secure by Letters Patent:—

1. A portable cooking apparatus comprising a main casing open at both ends and segmentally slotted in its peripheral wall above its longitudinal center, a boiler of lesser diameter than the casing and centrally supported within the same near its basal end, a feed-water reservoir on the exterior of the casing, tubular connections between the same and the boiler, removable means to close the top end of the casing, and a removable cooking pan provided with a transversely disposed supporting plate on its peripheral edge coinciding with the segmental opening in the casing when said parts are operatively assembled.

2. In a cooking apparatus of the character recited, a main casing peripherally slotted at its upper end, a boiler centrally supported in said casing at its lower end, an open-topped water reservoir mounted exteriorly of the casing in horizontal alinement with the boiler, tubular connections between the same, a steaming pan having a basal flange adapted to removably fit sleeve-like within the top of the casing, and operating to form a confined heating space in said casing above the boiler, tubular connections between the boiler and steaming pan, and a removable cooking pan adapted to be supported in said heating space within the casing and having a transversely disposed plate with an operating handle thereon, adapted to close the slotted opening in the casing when said elements are operatively assembled.

3. In a cooking apparatus of the character described, a main casing which is segmentally slotted at its upper end, a boiler centrally supported in said casing, means to supply water thereto, a flanged pan supported on the top end of said casing and forming an oven space above said boiler, a cooking pan removably supported within said oven space of the casing, said pan having a transversely disposed plate adapted to coincide with the segmental opening in the casing, and tubular means adapted to convey steam from the boiler to the flanged pan superposed on the casing.

4. A cooking apparatus of the character recited comprising in combination a main casing open at the base, a water reservoir mounted on the exterior thereof, a boiler centrally supported in the basal end of the casing, tubular connections between the water reservoir and the boiler, a steaming pan superposed on the upper end of the casing, a steam distributing reservoir centrally disposed therein and having a plurality of valved outlets, and tubular means to convey steam from the boiler to said central steam distributing reservoir in the superposed steaming pan.

5. An apparatus of the character recited, comprising in combination the slotted main casing, a cooking pan adapted to be removably supported within the interior thereof and having a transversely-disposed front plate operating as a removable closure for said opening in the casing, a boiler centrally supported in the lower portion of the casing, a reservoir on the exterior wall of the casing adapted to automatically supply water to the boiler, a steaming pan superposed on said casing, a steam distributing reservoir centrally disposed within the steaming pan, said reservoir having a plurality of valved outlets, tubular means to convey steam from the boiler to said central distributing reservoir, and a plurality of cooking vessels having slotted openings adapted to be removably supported within the steaming pan in communication with said valved steam outlets therein.

In testimony whereof, I have hereunto affixed my signature this 25th day of May A. D. 1908.

HENRY A. WINTERKNIGHT.

Witnesses:
  A. M. BIDDLE,
  R. A. DUNLAP.